F. E. SPENCER.
SPRING NUT LOCK.
APPLICATION FILED OCT. 14, 1912.
1,095,039.
Patented Apr. 28, 1914.
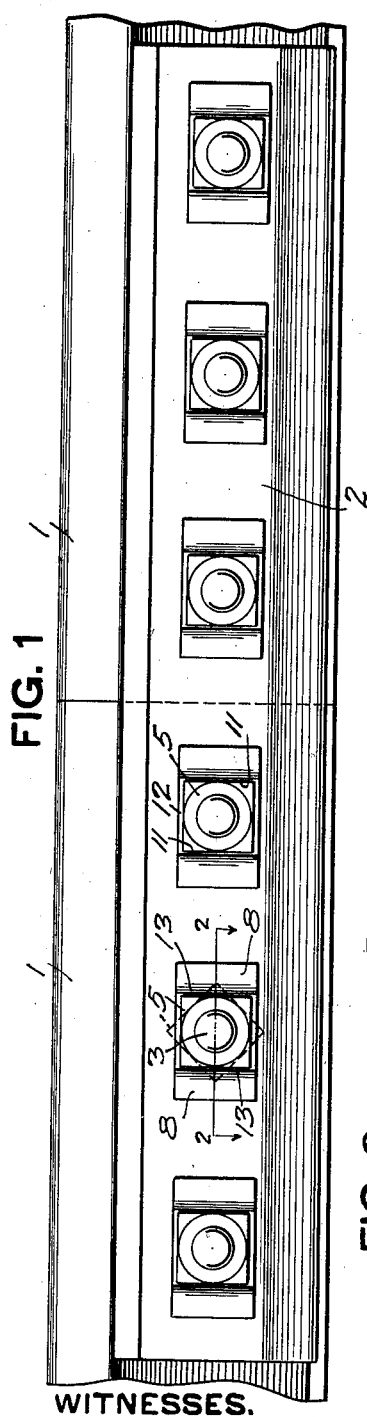
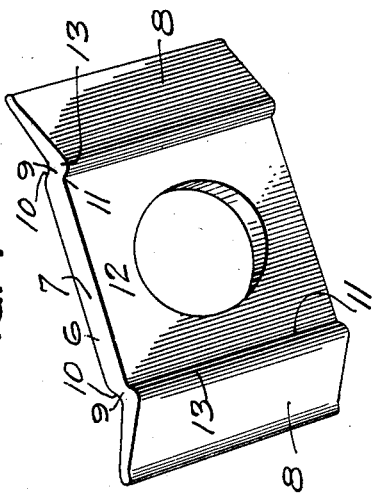
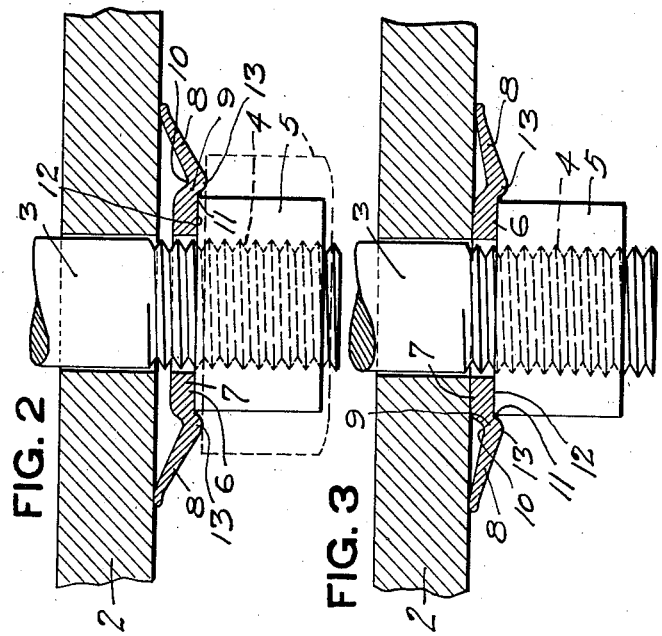
WITNESSES.
J. R. Keller
Robert C. Totten
INVENTOR.
Frank E. Spencer
By Kay & Totten
attorneys

UNITED STATES PATENT OFFICE.

FRANK E. SPENCER, OF PITTSBURGH, PENNSYLVANIA.

SPRING NUT-LOCK.

1,095,039. Specification of Letters Patent. Patented Apr. 28, 1914.

Application filed October 14, 1912. Serial No. 725,690.

*To all whom it may concern:*

Be it known that I, FRANK E. SPENCER, a citizen of the United States, and resident of Pittsburgh, in the county of Allegheny and State of Pennsylvania, have invented a new and useful Improvement in Spring Nut-Locks; and I do hereby declare the following to be a full, clear, and exact description thereof.

My invention relates to nut locks designed to prevent the accidental loosening of the nut, not only by causing a wedging or frictional engagement of the threads of the nut with the threads of the bolt, but also by a positive stop engaging the sides of the nut when seated. The wedging or frictional action between the threads is secured by making the lock in the form substantially of a spring washer which is more or less flattened out against its spring tendency by turning up the nut. The positive stop action is effected by projections or shoulders on the spring washer, so arranged as to engage one or more of the side faces of the nut to prevent turning.

The invention has further for its object to so construct this washer that the portions thereof which engage the member against which the nut is turned up may slide more or less freely on said member, thus allowing full play of the resiliency of the washer without danger of permanently distorting or breaking the same.

The invention has further for its object to provide a spring washer with a seat on its under side which will squarely engage the member against which the washer is clamped by the nut and which seat will not be dished or curved when sprung against the surface by the tightening of the nut.

With these objects in view the invention consists in a novel construction and arrangement of parts, preferred embodiments of which are illustrated in the accompanying drawings, in which—

Figure 1 shows a rail joint with my improved nut lock applied thereto; Fig. 2 is a sectional view on the line 2—2 Fig. 1, the nut being shown in elevation. Fig. 3 is a view similar to Fig. 2 showing the nut screwed home; and Fig. 4 is a perspective view of the spring washer and nut lock.

In the embodiment of the invention here shown, 1, 1 indicates the rail ends, and 2 the fish plate of a rail joint.

3 is a bolt having the threaded end 4 on which is threaded the nut 5, the nut in this instance being shown as an ordinary standard square nut, though obviously the nut may be hexagonal or with any other desired number of faces.

6 indicates the spring washer by which the locking action on the nut is secured. This washer has the central thickened portion 7 which projects inwardly at the under side forming the seat which as shown in Fig. 3 squarely engages the fish plate or other clamped member when the nut is turned home. Extending from opposite sides of the central or seat portion of the washer are the resilient wing-portions 8, which are connected with the central thickened seat portion by means of comparatively thin necks 9 formed by grooves or recesses 10 on the inner side of the washer adjacent the seat. The thickness of these resilient necks being determined by the distance between the bottom of the groove or depression 10 and the adjacent boundary line 11 of the nut seat face 12 at the outer side of the washer. At opposite sides of the nut seat face is a rib or shoulder 13 which determines the opposite boundary lines 11 of the nut seat face of the washer. These ribs or shoulders 13 form stop shoulders to prevent accidental loosening of the nut when the latter is turned up tight with opposite faces engaging these shoulders.

It will be seen from inspection of Figs. 2 and 3 that the boundary lines 11 of the nut seat face are a little outside of the thickened portion 6 of the washer. From this it results that when the nut is tightened up such tightening causes the resilient wings 8 to flatten allowing the thickened seat 7 of the washer to firmly and squarely engage the clamped surface of, for example the member 2. Further tightening up of the nut causes the wider portions thereof at its longer diameters to further flatten the wings 8 as the said portions ride over the stop shoulders 13, and the recessed portions 10 at the junction of the resilient wings and the body or thickened portion of the nut permit these shoulders 13 to be slightly depressed during the final turns of the nut so that the nut may be turned firmly and squarely down upon the nut seat face 12 of the washer. When this is accomplished, the resilient wings contract slightly allowing the stop shoulders 13 to rise up upon opposite sides of the nut and engage the bases of the opposite facets thereof. This engagement of the opposite facets of the nuts by means of the stop shoulders 13 securely holds the nut against accidental loosening, and as will be seen from an inspection of Fig. 3, in such position of the parts the inner face of the thickened portion 6 of the washer firmly and squarely engages the clamped member as 2 and the wings 8 constantly exert a spring pressure outwardly on the body or thickened portion 6 of the washer which causes corresponding frictional engagement of the threads of the nut and bolt.

If desired, some means, such as a shoulder or rib on the member to be clamped may be provided to engage the sides of the resilient wings to more certainly prevent rotation of the washer but the width of these wings provides sufficient area of frictional engagement of their ends with the clamped member to prevent effectually such movements.

It is obvious that the invention may be altered in detail within the scope of the appended claims.

What I claim is:

1. A combined nut lock and washer comprising a thick body portion forming a seat for the nut and having relatively thin resilient members extending from opposite sides thereof the extremities of said members projecting beyond the plane of the inner face of said body portion, each resilient member being joined to the body portion by a thinned flexible neck and a stop shoulder on one or more of said resilient members adjacent the nut seat of the body portion and adjacent said thinned neck portion to prevent accidental loosening of the nut when tightened up.

2. A combined nut lock and washer comprising a comparatively thick body portion forming a seat for the nut and having resilient members connected with the outer face of said body portion by comparatively thin spring necks, the outer faces of said necks projecting above the neck seat forming stop shoulders to prevent accidental loosening of the nut when seated between them on said body portion.

3. A combined nut lock and washer comprising a comparatively thick body portion forming a seat for the nut and having resilient members extending from opposite sides thereof, their outer extremities normally projecting beyond the plane of the inner face of the body portion, depressions or grooves at the inner faces of the junctions of said body portion and resilient members and stop shoulders on said resilient members adjacent said depressions whereby the nut may be turned down squarely on the outer face of said body portion to force the inner face thereof squarely against the member to be clamped, with said shoulders engaging the sides of the nut.

4. A combined nut lock and washer comprising a comparatively thick central body portion forming a seat for the nut and having resilient wing-like members extending from opposite sides thereof, the outer extremities of said members projecting beyond the plane of the inner face of the body portion, the inner face of the body portion being flat and lying in a plane inwardly of the junctions of said resilient members therewith, one or more of said wing-like members having projections or shoulders adjacent the junction with the body portion to form stop shoulders for the nut when the latter is turned up to force the body portion squarely and firmly against the member to be clamped.

5. A combined nut lock and washer comprising a flat body portion forming a seat for the nut and having resilient members extending from opposite sides thereof, the plane of the junction of said members with said body portion being outside of the plane of the inner face of said body portion, the outer extremities of said resilient members projecting within the plane of the inner face of said body portion and having curved bearing faces, said resilient members having projections or shoulders thereon adjacent said body portion to form stop shoulders for the nut when turned up to tightened position.

In testimony whereof, I the said FRANK E. SPENCER, have hereunto set my hand.

FRANK E. SPENCER.

Witnesses:
ROBERT C. TOTTEN,
JOHN F. WILL.

---

Copies of this patent may be obtained for five cents each, by addressing the "Commissioner of Patents, Washington, D. C."